United States Patent
Grosso

(10) Patent No.: US 10,986,018 B2
(45) Date of Patent: Apr. 20, 2021

(54) REDUCING TRAFFIC OVERLOAD IN SOFTWARE DEFINED NETWORK

(71) Applicant: Telefonaktiebolaget LM Ericsson (publ), Stockholm (SE)

(72) Inventor: Renato Grosso, Genoa (IT)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 22 days.

(21) Appl. No.: 15/571,757

(22) PCT Filed: May 5, 2015

(86) PCT No.: PCT/EP2015/059820
§ 371 (c)(1),
(2) Date: Nov. 3, 2017

(87) PCT Pub. No.: WO2016/177404
PCT Pub. Date: Nov. 10, 2016

(65) Prior Publication Data
US 2018/0145902 A1    May 24, 2018

(51) Int. Cl.
*H04L 12/721*   (2013.01)
*H04L 12/851*   (2013.01)
(Continued)

(52) U.S. Cl.
CPC .............. *H04L 45/38* (2013.01); *H04L 47/11* (2013.01); *H04L 47/2441* (2013.01);
(Continued)

(58) Field of Classification Search
CPC ..... H04L 47/11; H04L 47/2441; H04L 45/38; H04L 49/501
See application file for complete search history.

(56) References Cited

U.S. PATENT DOCUMENTS

| 6,721,797 B1 | 4/2004 | Kim |
| 7,617,170 B2 | 11/2009 | Chesla |

(Continued)

FOREIGN PATENT DOCUMENTS

| EP | 2772021 A2 | 9/2014 |
| WO | 2013106386 A2 | 7/2013 |

OTHER PUBLICATIONS

PCT International Search Report, dated Dec. 10, 2015, in connection with International Application No. PCT/EP2015/059820, all pages.

(Continued)

*Primary Examiner* — Hassan Kizou
*Assistant Examiner* — Hector Reyes
(74) *Attorney, Agent, or Firm* — Leffler Intellectual Property Law, PLLC

(57) ABSTRACT

For managing a traffic overload in a software defined network having an SDN controller, when an indication of a traffic overload is received, there are steps of identifying traffic flows which contribute to this, identifying nodes of the network controllable by the SDN controller and located along a path of the identified traffic flows before the location of the traffic overload. The SDN controller is used to control the identified nodes to control the identified traffic flows to reduce the traffic overload. By using the SDN controller to control the reduction compared to diverting suspicious traffic flows to a separate external security server, the extra network resources used for carrying the diverted traffic flows are not needed, the separate security server is not needed, and the risk of such diverted traffic flows themselves causing overloads is reduced. It can be applicable to a range of causes of overload, including denial of service attacks.

20 Claims, 13 Drawing Sheets

(51) Int. Cl.
*H04L 12/801* (2013.01)
*H04L 29/06* (2006.01)
*H04L 12/931* (2013.01)
*H04L 12/70* (2013.01)

(52) U.S. Cl.
CPC ........ *H04L 49/501* (2013.01); *H04L 63/1458* (2013.01); *H04L 2012/5684* (2013.01)

(56) References Cited

U.S. PATENT DOCUMENTS

| | | | |
|---|---|---|---|
| 7,624,084 B2 | 11/2009 | Chesla | |
| 2013/0294236 A1* | 11/2013 | Beheshti-Zavareh | H04L 47/22 370/235 |
| 2013/0333029 A1 | 12/2013 | Chesla et al. | |
| 2014/0281020 A1* | 9/2014 | Crisan | H04L 49/25 709/235 |
| 2015/0103659 A1* | 4/2015 | Iles | H04L 47/11 370/235 |
| 2015/0188820 A1* | 7/2015 | Anghel | H04L 47/115 370/235 |
| 2015/0215235 A1* | 7/2015 | Li | H04L 47/782 370/235 |
| 2015/0319090 A1* | 11/2015 | Fu | H04L 41/06 370/235 |

OTHER PUBLICATIONS

PCT Written Opinion, dated Dec. 10, 2015, in connection with International Application No. PCT/EP2015/059820, all pages.

S. Lim et al., A SDN-Oriented DDoS Blocking Scheme for Botnet-Based Attacks, 2014 Sixth International conference on Ubiquitous and Future Networks, Jul. 8, 2014, pp. 63-68.

Internetwork Design Guide—Increasing Security on IP Networks, DocWiki, obtained from the internet on Oct. 17, 2017, pp. 10=-24.

* cited by examiner

REDUCING TRAFFIC OVERLOAD IN SOFTWARE DEFINED NETWORK

TECHNICAL FIELD

The present invention relates to methods of methods of managing a traffic overload in a software defined network (SDN), to apparatus for managing a traffic overload in an SDN network having an SDN controller, and to corresponding computer programs.

BACKGROUND

It is known to provide software defined networks (SDN) which have an architecture that provides centralized management of network elements rather than a distributed architecture utilized by conventional networks. In the SDN, a network element or node follows routing, or switching, decisions received from a central controller. Operation of a node can be logically divided into a "control path" and a "data path". In the control path, control protocols, e.g., for building in routing protocols, a spanning tree, and so on, are operable. In the data path, packet-processing operations are performed such as examining each incoming packet and making decisions such as packet forwarding, packet switching and so on. In a conventional network, network elements typically include both control and data planes, whereas in an SDN, the network elements include the data path, and a centralized SDN controller implements the control path.

The SDN controller can communicate with the nodes using a protocol such as the OpenFlow protocol which allows the SDN controller to dynamically define the traffic handling decisions in the node.

SDN and Network Function Virtualization NFV typically involve allowing the dynamic and flexible creation of sub-networks completely manageable by software. This can mean providing an evolved NMS (Network Management System) that makes it possible to refactor network characteristics on the basis of events such as arrival/departure of hosts, traffic load fluctuations, etc. aimed at optimizing network utilization, performances, costs, revenues, etc. SDN architecture is typically characterized by three key attributes:

- Logically centralized intelligence—By centralizing network intelligence, decision-making is facilitated based on a global (or domain) view of the network, as opposed to today's networks, which are built on autonomous systems where nodes are unaware of the overall state of the network.
- Programmability—SDN networks are inherently controlled by software functionality, which may be provided by vendors or the network operators themselves.
- Abstraction—The business applications that consume SDN services are abstracted from the underlying network technologies.

Traffic overloads may arise for various reasons, for example caused by malicious distributed denial of service DDOS attacks, or perhaps because resources are not dimensioned for the given load, for instance as a consequence of some optimization policy where some resource is sleeping for power saving purposes or just because it is temporarily assigned to other tasks and cannot react as readily as would be necessary. Examples may include physical or virtual routers, switches, load-balancers, firewalls, etc.

It is known to use a network management system to collect detailed statistics of traffic flows for capacity planning, billing, and troubleshooting functions. Information on traffic passing through particular nodes can include for example source and destination IP addresses, input and output interface numbers, TCP/UDP source port and destination ports, and number of bytes and packets in the flow.

For mitigating denial of service (DoS) attacks in a software defined networking (SDN) based network, it is known to respond to a DoS attack indication performed against at least one destination server by controlling edge nodes of the SDN to mark a diversion field in each packet in the incoming traffic addressed to the destination server so that any node in the SDN receiving the packet with the marked diversion field is programmed to divert the packet to an external security server. Here a decision is made as to whether to slow or stop this flow, or if it is regarded as clean traffic, to inject it back into the SDN without the mark so that it is passed on to its destination.

SUMMARY

Embodiments of the invention can provide improved methods or apparatus. According to a first aspect of the invention, there is provided a method of managing a software defined network having an SDN controller, and having steps of: receiving an indication of a traffic overload, identifying at least one traffic flow which contributes to the traffic overload, and identifying at least one node of the software defined network which is configured to be controllable by the SDN controller and located along a path of at least one of the identified traffic flows between its source and a location of the traffic overload. Then there is a step of responding to the traffic overload by using the SDN controller to control the identified at least one node to control the identified at least one traffic flow to reduce the traffic overload.

A benefit of using the SDN controller to control the reduction of the traffic overload compared to the conventional technique of diverting suspicious traffic flows to a separate external security server for controlling the rate reduction, is that the extra network resources used for carrying the diverted traffic flows are not needed. Also the separate security server for processing the diverted traffic flows is not needed, and there is no need to modify the edge nodes to insert and/or recognise special markers. For these reasons the overloads can be handled with much more efficiency than before. Notably the risk of such diverted traffic flows themselves causing overloads is avoided. Furthermore this is applicable to a wider range of causes of overload, not only denial of service attacks.

Any additional features can be added, and some are described below and set out in dependent claims. One such additional feature is that the identifying of the at least one traffic flow which contributes to the overload is done by analysing packet information of the traffic which could reach the location of the traffic overload.

Another such additional feature is the analysing comprising at least one of: finding groups of packets having characteristics in common, comparing packet address information of the packet information to a predetermined selection of addresses, comparing source address information to a predetermined selection of source addresses, identifying groups having the same destination address, identifying corrupted packets, identifying anomalous rates of occurrence of given addresses, and identifying changes when a rate of one traffic flow is temporarily altered.

Another such additional feature is the step of identifying at least one node of the software defined network comprising at least one of: identifying an ingress node based on source addresses of the groups of packets, and identifying an intermediate node along the path based on a record of a routing of the path.

Another such additional feature is the step of controlling the identified at least one node to reduce the traffic overload comprising at least one of: slowing down a packet delivery rate, discarding packets, buffering packets, and filtering out packets having a priority level lower than a given level.

Another such additional feature is the step of controlling the identified at least one node to reduce the traffic overload comprising, if the source is an interface with a neighbouring software defined network, sending a request to that neighbouring software defined network to reduce a rate at which it sends the traffic flow to the interface.

Another such additional feature is the step of controlling the identified at least one node to reduce the traffic overload comprising diverting the identified traffic flow towards an alternative path avoiding the location of the traffic overload.

Another such additional feature is the step of identifying the traffic flows contributing to the overload being carried out without diverting the traffic flows.

Another such additional feature is the subsequent step of causing the identified at least one programmable node to restore in stages the rate of the identified at least one traffic flow when the traffic overload is eased, and reverting to a previous stage of the restoration if a current stage of the restoration causes a traffic overload.

Another such additional feature is the step of storing a signature of the at least one identified traffic flows for use by the control plane in responding to subsequent traffic overloads.

Another aspect of the invention provides a non transitory machine readable medium having instructions stored thereon which when executed by a processor cause the processor to carry out a method of managing traffic overload in a software defined network as set out above, optionally with any of the above mentioned additional features.

Another aspect provides apparatus for managing a traffic overload in a software defined network, the network having an SDN controller and nodes capable of passing traffic flows and being controllable by the SDN controller, the apparatus having a processing circuit and a memory circuit, the memory circuit having instructions executable by the processor circuit. The processing circuit when executing the instructions is configured to receive an indication of a traffic overload, to identify at least one traffic flow which contributes to the traffic overload, and to identify at least one node of the software defined network along a path of at least one of the identified traffic flows between its source and a location of the traffic overload. Then it can respond to the traffic overload by using the SDN controller to control the identified at least one node to control the identified at least one traffic flow to reduce the traffic overload. The apparatus can comprise the SDN controller or some parts of the apparatus can be implemented outside the SDN controller.

One such additional feature is the processing circuit being configured to identify the at least one traffic flow which contributes to the overload by analysing packet information of the traffic which could reach the location of the traffic overload.

Another such additional feature is that for the operation of the analysing, the processing circuit is adapted to perform at least one of: finding groups of packets having characteristics in common, comparing address information of the packet information to a predetermined selection of addresses, comparing source address information to a predetermined selection of source addresses, identifying groups having the same destination address, identifying corrupted packets, identifying anomalous rates of occurrence of given addresses, and identifying changes when a rate of one traffic flow is temporarily altered.

Another such additional feature is that for the operation of identifying at least one node of the software defined network, the processing circuit is adapted to perform at least one of: identifying an ingress node based on source addresses of the groups of packets, and identifying an intermediate node along the path based on a record of a routing of the path.

Another such additional feature is that for the operation of controlling the at least one of the nodes, the processing circuit is adapted to perform at least one of: slowing down a packet delivery rate, discarding packets, buffering packets, and filtering out packets having a priority level lower than a given level.

Another such additional feature is that for the operation of controlling the at least one of the nodes, the processing circuit is adapted to send, if the source is an interface with a neighbouring software defined network, a request to that neighbouring software defined network to control one of its nodes to reduce a rate at which it sends the traffic flow to the interface.

Another such additional feature is that for the operation of controlling the at least one of the nodes, the processing circuit is adapted to divert the identified traffic flow towards an alternative path avoiding the location of the traffic overload.

Another aspect of the invention provides apparatus for managing a traffic overload in a software defined network, the network having an SDN controller and nodes capable of passing traffic flows and being controllable by the SDN controller, the apparatus having a module for receiving an indication of a traffic overload, a module for identifying at least one traffic flow which contributes to the traffic overload, and a module for identifying at least one node of the software defined network along a path of at least one of the identified traffic flows between its source and a location of the traffic overload. There is also a module for responding to the traffic overload by using the SDN controller to control the identified at least one node to reduce the traffic overload.

Another such additional feature is the module for identifying the at least one traffic flow which contributes to the overload having a module for analysing packet information of the traffic which could reach the location of the traffic overload.

Another such additional feature is the module for identifying the at least one traffic flow which contributes to the overload having at least one of: a module for finding groups of packets having characteristics in common, a module for comparing address information of the packet information to a predetermined selection of addresses, a module for comparing source address information to a predetermined selection of source addresses, a module for identifying groups having the same destination address, a module for identifying corrupted packets, a module for identifying anomalous rates of occurrence of given addresses, and a module for identifying changes when a rate of one traffic flow is temporarily altered.

Another such additional feature is the module for identifying at least one node of the software defined network comprising a module for at least one of: identifying an ingress node based on source addresses of the groups of packets, and identifying an intermediate node along the path based on a record of a routing of the path.

Another such additional feature is the module for controlling the node comprising at least one of: a module for causing a slowing down a packet delivery rate, a module for causing discarding of packets, a module for causing buffering packets, and a module for causing filtering out of packets having a priority level lower than a given level.

Another such additional feature is the module for controlling the node comprising, if the source is an interface with a neighbouring software defined network, a module for sending a request to that neighbouring software defined network to control one of its nodes to reduce a rate at which it sends the traffic flow to the interface.

Another such additional feature is the module for controlling the node comprising a module for diverting the identified traffic flow towards an alternative path avoiding the location of the traffic overload.

Any of the additional features can be combined together and combined with any of the aspects. Other effects and consequences will be apparent to those skilled in the art, especially over compared to other prior art. Numerous variations and modifications can be made without departing from the claims of the present invention.

BRIEF DESCRIPTION OF THE DRAWINGS

How the present invention may be put into effect will now be described by way of example with reference to the appended drawings, in which.

DETAILED DESCRIPTION

Figure 1:
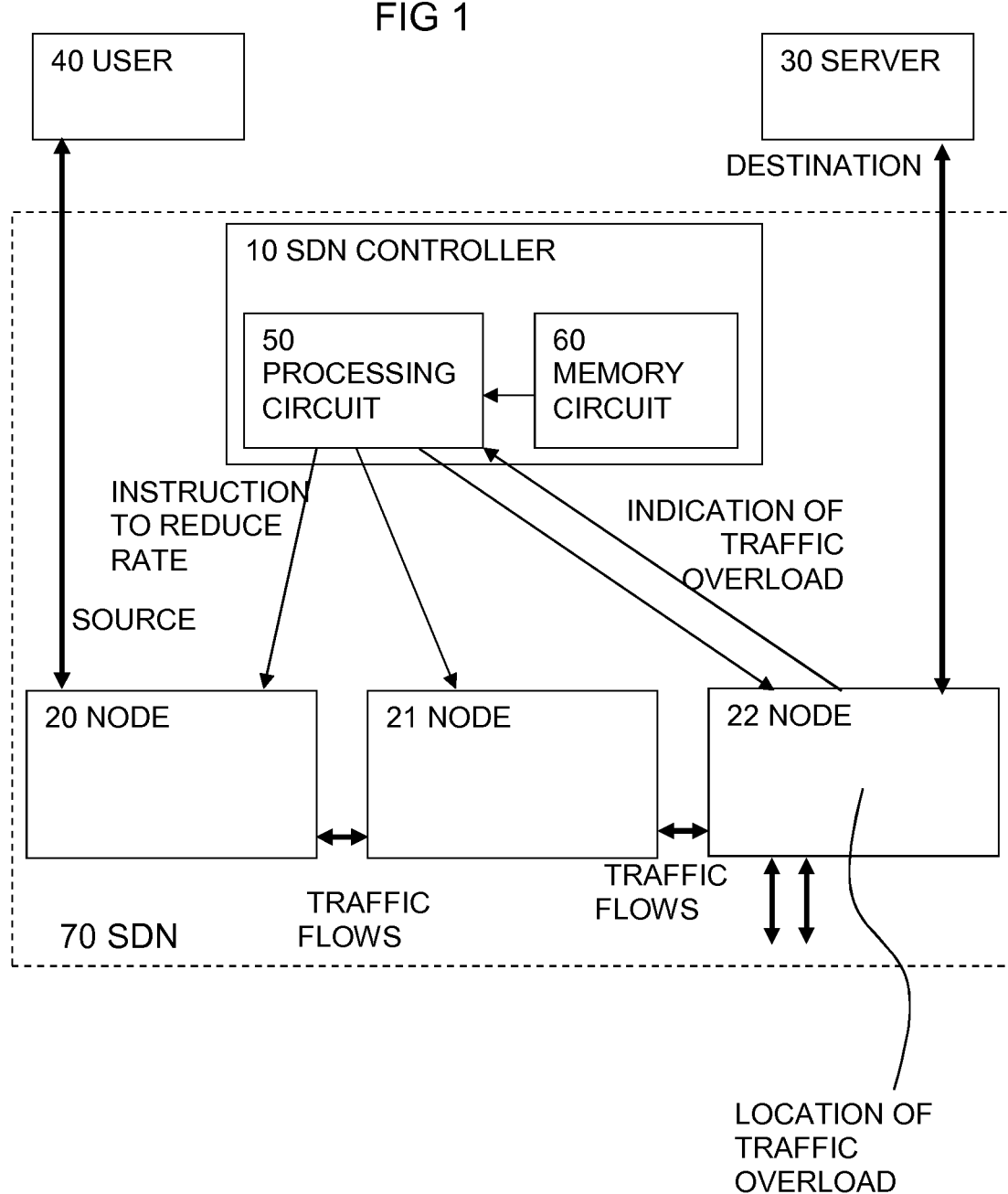
FIG. 1 shows a schematic view of SDN network according to an embodiment.

The present invention will be described with respect to particular embodiments and with reference to certain drawings but the scope of the invention is not limited thereto. The drawings described are only schematic and are non-limiting. In the drawings, the size of some of the elements may be exaggerated and not drawn to scale for illustrative purposes.

Definitions

Where the term "comprising" is used in the present description and claims, it does not exclude other elements or steps and should not be interpreted as being restricted to the means listed thereafter. Where an indefinite or definite article is used when referring to a singular noun e.g. "a" or "an", "the", this includes a plural of that noun unless something else is specifically stated.

References to software or programs or instructions can encompass any type of programs in any language executable directly or indirectly on processing hardware.

References to processors, hardware, circuits or processing circuits can encompass any kind of logic or analog circuitry, integrated to any degree, and not limited to general purpose processors, digital signal processors, ASICs, FPGAs, discrete components or logic and so on. References to a processing circuit are intended to encompass implementations using multiple processors which may be integrated together, or co-located in the same node or distributed at different locations for example.

References to indication of traffic overload can encompass any kind of direct or indirect indication, including indications of level of traffic which have yet to be compared to a threshold, and including indications of approach to a threshold.

References to traffic flow can encompass any kind of traffic flow, not limited to packet flows, or groups of packets having corresponding source or destination addresses.

References to SDN are intended to encompass any kind of communications network which has an architecture in which network control functions are decoupled from forwarding or data path functions, enabling network control to become directly programmable and the underlying infrastructure for the data paths to be abstracted from applications and network services. It is open standards-based and vendor-neutral. Typically but not necessarily, the Openflow protocol is used between the control functions and the data path functions. Network intelligence is (logically) centralized in SDN controllers which maintain a global view of the network. It is programmatically configured in the sense that network managers can configure, manage, secure, and optimize network resources very quickly via dynamic, automated SDN programs.

References to an SDN controller are intended to encompass any kind of controller for managing a software defined network or managing a domain of a software defined network, and including centralized or distributed implementations.

Abbreviations

ASIC—Application Specific Integrated Circuit
CDPI—Control to Data Plane Interface
DoS—Denial of Service
DDoS—Distributed Denial of Service
NBI—North Bound Interface
NFV—Network Function Virtualization
NMS—Network Management System
NMS_BP—Network Management System based Back Pressure
QoE—Quality of Experience
QoS—Quality of Service
SDN—Software Defined Network or Software Defined Networking

INTRODUCTION

By way of introduction to the embodiments, some issues with conventional designs will be explained. A general aim in managing a network is to maintain standards of quality of service (QoS) and quality of experience (QoE) for users.

Hence the resources and management of the network should react promptly enough to a traffic overload in the sense of level of traffic approaching or reaching unsustainability. This may be induced by an unpredicted traffic increase or by a malware attack or even by faults. The network should be able to respond to the event with the necessary re-configuration of the infrastructure in a timely manner. But re-configuration may be not as prompt as needed for instance because it requires re-computation of paths, or maybe it is simply not possible or useful in that particular case. In such cases traffic beyond the supported level can result in severe packet drops and undesirable impacts on quality of service and quality of experience.

In a given link of a network it is known to apply back pressure at a link level, which is a feedback mechanism halting the transmitting device from sending data packets as soon as receiver's buffer is full and incapable of receiving any more data. The receiver can cause the transmitter to resume sending when the receiver's buffer is emptied and is once more capable of storing information. As soon as a full buffer is detected, the receiver sends back to the transmitter a request to halt traffic transmission, thus making use of the buffering capacity of the transmitting side in the attempt to avoid dropping packets.

However it is now appreciated that this does not address the real cause of the problem, but only acts locally on the link and just moves back the problem on the transmitter's buffer, with the risk of filling it and then causing traffic to be discarded. Hence a larger scale approach is needed, applicable to networks not just to links. In the field of SDN networks, as described above, a network approach has involved redirecting traffic flows to an external security server to identify and control whether to slow or stop particular flows causing the overload, in order to prevent the network resources from being overwhelmed. But it has now been appreciated that this has drawbacks as follows: a dedicated field in the packet header is needed which is actually not standard in IPv4 nor in IPv6, it needs dedicated alterations to edge nodes to mark any incoming packet, and needs significant additional resources for diverting flows to the security server.

In embodiments described below, the traffic overload can be managed using the SDN controller, by analyzing the traffic flows and using the SDN controller to control particular traffic flows to reduce the traffic overload without needing the dedicated external secure server, and thus without needing the resources for diverting the traffic flows. This reduces the risk of the diverting increasing the traffic load, which might worsen the situation instead of solving it. Instead the traffic or at least just the relevant information (such as source/destination addresses) can be sent to the control plane of the network, although entire packets can be analyzed if needed. Hence the processing and communication resource required for the analysis can be quite low compared to conventional methods. By using NMS components either within the SDN controller or coupled to it, the computational load for the analysis can be split between the NMS and the various nodes of the network, and there is little additional resource needed, especially as the nodes typically are already used to open each packet to see source/destination address in their conventional operations. Because an SDN controller already has a global or domain view of the SDN architecture, this can facilitate finding a path and a source of each traffic flow contributing to the overload, to enable the control of a node at or near the source of the traffic flow to reduce the traffic overload. This can be regarded as a more efficient way of implementing a network scale back pressure to reduce the traffic overload, and will be referred to as an NMS Back Pressure (NMS_BP) feature.

FIG. 1, Schematic View of SDN Network According to an Embodiment

FIG. 1 shows a schematic view of an SDN network 70 having a number of nodes 20, 21, 22 coupled by links for passing traffic flows from a source (server 30) to a destination (user 40) and vice versa. In practice there would be many more nodes (not shown) and many more links between nodes. An SDN controller 10 is provided, coupled to control the nodes. The SDN controller is shown as having a processing circuit 50 and memory circuit 60 for storing instructions for the processing circuit. Other ways of implementing the SDN controller can be envisaged, and it can be located at a central location or distributed, and can be distributed to share facilities with the nodes for example. The SDN controller typically is used for some network management functions, but some can be implemented external to the SDN controller and coupled to the SDN controller.

Any of the nodes may suffer a traffic overload and an indication of such an overload can be sent to the SDN controller. In the example of FIG. 1 an indication is being sent from the node shown at a right hand side, node 22. This is received at the SDN controller and prompts the SDN controller to identify a traffic flow contributing to the overload, and to send an instruction to control a node 20 at or near a source of the identified traffic flow, to reduce the traffic overload. There are various ways to reduce the traffic overload, as will be described below in more detail. There are various ways of detecting a traffic overload, and various ways of identifying which traffic flows are contributing and identifying which node can be used to control the identified traffic flows before they reach the traffic overload, as will be described below. Hence FIG. 1 shows an example of apparatus for managing a traffic overload in a software defined network having an SDN controller. The apparatus can comprise the SDN controller, or in other cases part of the apparatus can be outside the SDN controller.

Figure 2:
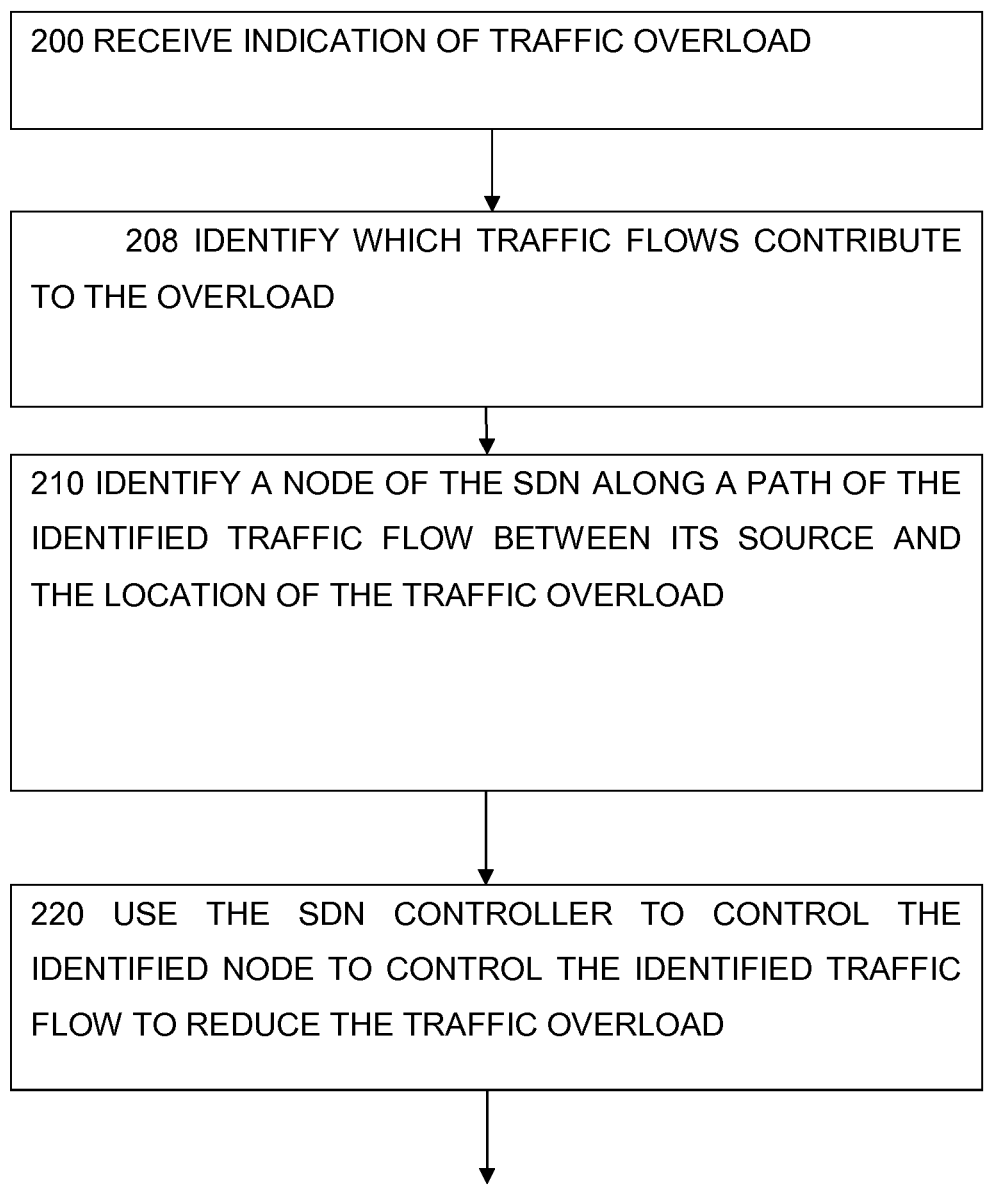
FIG. 2 shows operational steps according to an embodiment.

FIG. 2, Operation According to an Embodiment

FIG. 2 shows operational steps of a NMS_BP feature in or associated with the SDN controller, to manage the traffic overload according to an embodiment, and can be used in the arrangement of FIG. 1 or other embodiments. The steps can all be carried out at the SDN controller in some embodiments, or in other embodiments some steps can be carried out elsewhere, for example at network management components at other locations coupled to the SDN controller, for example in a data layer or an application layer, or in a control layer of the SDN network. At step 200 an indication of traffic overload is received. This can take place at the SDN controller or at various other network management components in the network and can encompass for example detecting a traffic level or traffic delay, which is compared to a threshold at the node or at the SDN controller. This result of the comparison can be interpreted as an indication of overload if it exceeds the threshold, or is approaching the threshold. The interpretation may depend on a series of results. This indication then prompts a step 208 of identifying which traffic flows contribute to the overload. This analysis can take place at the SDN controller or at various other network management components of the network and can encompass any way of identifying such traffic flows and a number of examples are described below with reference to FIGS. 3 and 4. Such analysis can in some cases be performed at the application layer of the SDN network, for instance, to give the operator the possibility to adjust or customize it.

This enables step 210 of identifying a node of the SDN along a path of the identified traffic flow between its source and a location of the traffic overload. Some examples of ways of implementing this step are described below with reference to FIG. 5. Again this step can take place at the SDN controller or at other parts of a network management system. As an example a network management system typically has a path computation engine which can run elsewhere, and can provide an input to the step of identifying a node along the path or to identifying an alternative path in a case of diverting the traffic flow. Again such identification can in some cases be performed at the application layer, for instance, to give an operator the possibility to adjust/customize it. If the SDN controller is used, the global view of the network it has can be useful in identifying the source or nodes along the path. Then at step 220 there is a step of using the SDN controller to control the identified node to control the identified traffic flows to reduce the traffic overload. This can encompass any way of controlling and some examples are shown and described below with reference to FIGS. 6 and 7. This can involve controlling a suitable node such as one at or near a source of the traffic flow.

Thus FIG. 2 shows an example of a method of managing a traffic overload in a software defined network having an SDN controller, and having steps of: receiving an indication of a traffic overload, identifying at least one traffic flow which contributes to the traffic overload, identifying at least one node of the software defined network which is configured to be controllable by the SDN controller and located along a path of at least one of the identified traffic flows between its source and a location of the traffic overload, and responding to the traffic overload by using the SDN controller to control the identified at least one node to control the identified at least one traffic flow to reduce the traffic overload. The SDN controller is used to control the reduction of the traffic overload instead of the conventional technique of diverting suspicious traffic flows to a separate external security server for controlling the rate reduction. A consequence is that the extra network resources used for carrying the diverted traffic flows are not needed. Also the separate security server for processing the diverted traffic flows is not needed, and there is no need to modify the edge nodes to insert and/or recognise special markers. For these reasons the overloads can be handled with much more efficiency than before. Notably the risk of such diverted traffic flows themselves causing overloads is avoided. Furthermore this is applicable to a wider range of causes of overload, not only denial of service attacks.

Resource Monitoring to Detect Traffic Overloads

In order to detect the utilization level of resources, several system resources and performances can be monitored as part of the step 200 of receiving a traffic overload indication. This can involve features such as: traffic counters, queue filling counters or flags, etc. but also dedicated applications to verify network load such as round trip delay measurements that can be periodically performed by the NMS. Various levels of resource utilization may apply, for example:

Low—resources are underutilized, no actions from NMS
Normal—resources aren't overused, no actions from NMS
Medium—slightly overuse, NMS back pressure feature (NMS_BP) can be applied in a limited manner
High—severe overuse, NMS_BP can be applied in larger scale As soon as a critical situation is detected an indication such as a flag towards the NMS is raised by the given network element, for example a router. As an alternative, excess round trip delay may be measured on a given path to detect overload. The NMS may launch a campaign of periodic round trip delay measurements to keep the network's resources utilization under stricter observation.

This may enable the resources (queues, memories, forwarding engines, etc.) to report promptly the issue to the NMS, before they are overwhelmed. The NMS_BP feature in the SDN controller or associated with it, can then identify the most probable sources of traffic overload by means of a stored list of potentially critical addresses for example, and then request to the given traffic sources to slow down their traffic delivery rate, until the network resources utilization returns to a normal level. As soon as the overload has eased and resource utilization reaches an acceptable level, the request to the identified nodes to reduce the rate can be released, re-establishing the transfer rate. These sources of the traffic flows can gradually be allowed to restore the requested traffic again at the previous rate.

Figure 3:
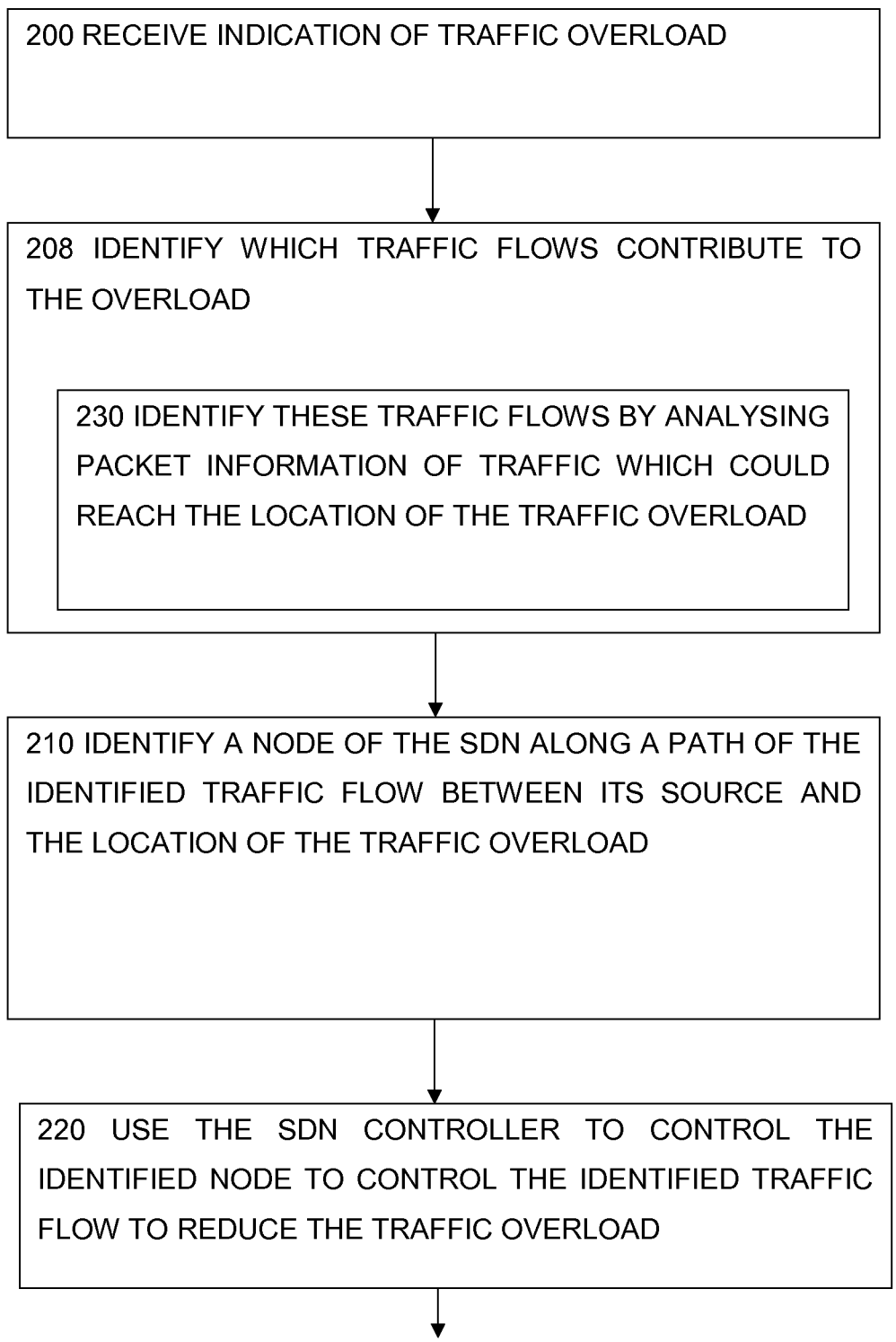
FIGS. 3 and 4 show embodiments showing ways of identifying traffic flows.
Figure 4:
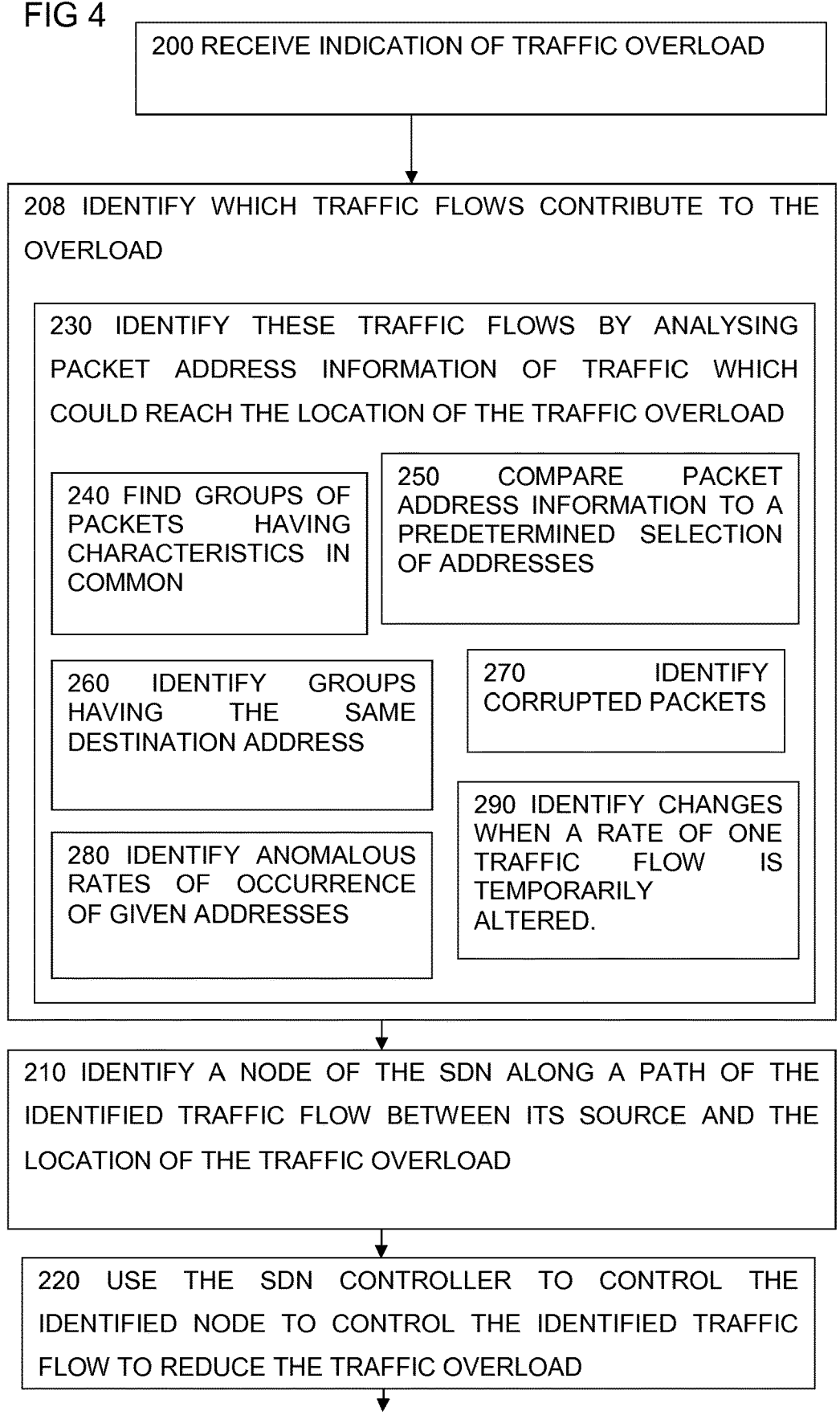

FIGS. 3 and 4, Embodiments Showing Ways of Identifying Traffic Flows

FIG. 3 shows operational steps of the NMS_BP feature in or associated with the SDN controller according to an embodiment, and similar to those of FIG. 2 and corresponding reference numerals have been used as appropriate. At step 200 an indication of traffic overload is received. This indication then prompts a step 208 of identifying which traffic flows contribute to the overload. This is shown as being implemented by a step 230 of identifying these traffic flows by analyzing packet address information of traffic which could reach the location of the traffic overload. This enables steps 210 and 220 to follow as described above for FIG. 2.

By carrying out this analysis at the SDN controller of the network rather than at an external security server, the analysis can be done without diverting the entire traffic flow to such a server and can make more use of existing network management resources and thus be more efficient. Considering that the SDN controller can be implemented in various ways including distributed or localised ways, this does not limit where the analysis takes place and so can encompass the possibility of sending the packet address information to different locations for analysis, with or without the rest of the packet, if needed.

FIG. 4 shows operational steps of the NMS_BP feature in or associated with the SDN controller according to an embodiment, and similar to those of FIG. 3 and corresponding reference numerals have been used as appropriate. At step 200 an indication of traffic overload is received. This indication then prompts a step 208 of identifying which traffic flows contribute to the overload. This is shown as being implemented by a step 230 of identifying these traffic flows by analyzing packet address information of traffic which could reach the location of the traffic overload. This step 230 is shown as being implemented in various alternative ways. Step 240 shows one of these alternatives and involves finding groups of packets having characteristics in common. Step 250 shows another of these alternatives and involves comparing the packet address information to a predetermined selection of addresses. Step 260 shows another of these alternatives and involves identifying groups having the same destination address. Another of these alternatives is shown in step 270 and involves identifying corrupted packets, as this might indicate an attempt to spoof addresses. Another alternative is shown in step 280 and involves identifying anomalous rates of occurrence of the same addresses. Another alternative is shown in step 290 which involves identifying changes such as changes in traffic loading when a rate of one or more of the traffic flows is temporarily altered. More alternatives can be envisaged and any of these alternatives can be used in combination, they are not mutually exclusive.

Traffic Flow Identification

This step 230 can be carried out in various ways. Immediately after the critical traffic overload situation is detected and communicated to the NMS, the NMS_BP feature can start to collect the relevant information (source addresses, destination addresses, etc.) of all packets incoming the affected interfaces. At the NMS an analytical analysis of such traffic can be performed, for instance by comparing source addresses to a list of pre-identified addresses representing the potentially critical sources of data. Such a list can comprise large data delivery servers such as video servers, content delivery servers (media files, documents, etc.), e-commerce portals, live-streaming media, social networks serves, etc. as well as other low priority data servers or even previously identified sources of supposed malware traffic to consider the possibility of flooding attacks.

As an alternative, the NMS_BP feature can try to identify the particular set of packets that are causing overload, for instance the address sources of packets intended for the overwhelmed address, or more in general the collection of packets from one or more flows that have some property in common: packets having same source address, or same destination address, etc. A further analytic can be based for instance on that packets that looks to be potentially corrupted, e.g. with bad checksum, etc. An aim of this analytical analysis is to identify aggregates of packets that may be responsible for the traffic overload to enable selective control to prevent them getting to the location of the overload, or to the potential victim of a malicious attack.

Figure 5:
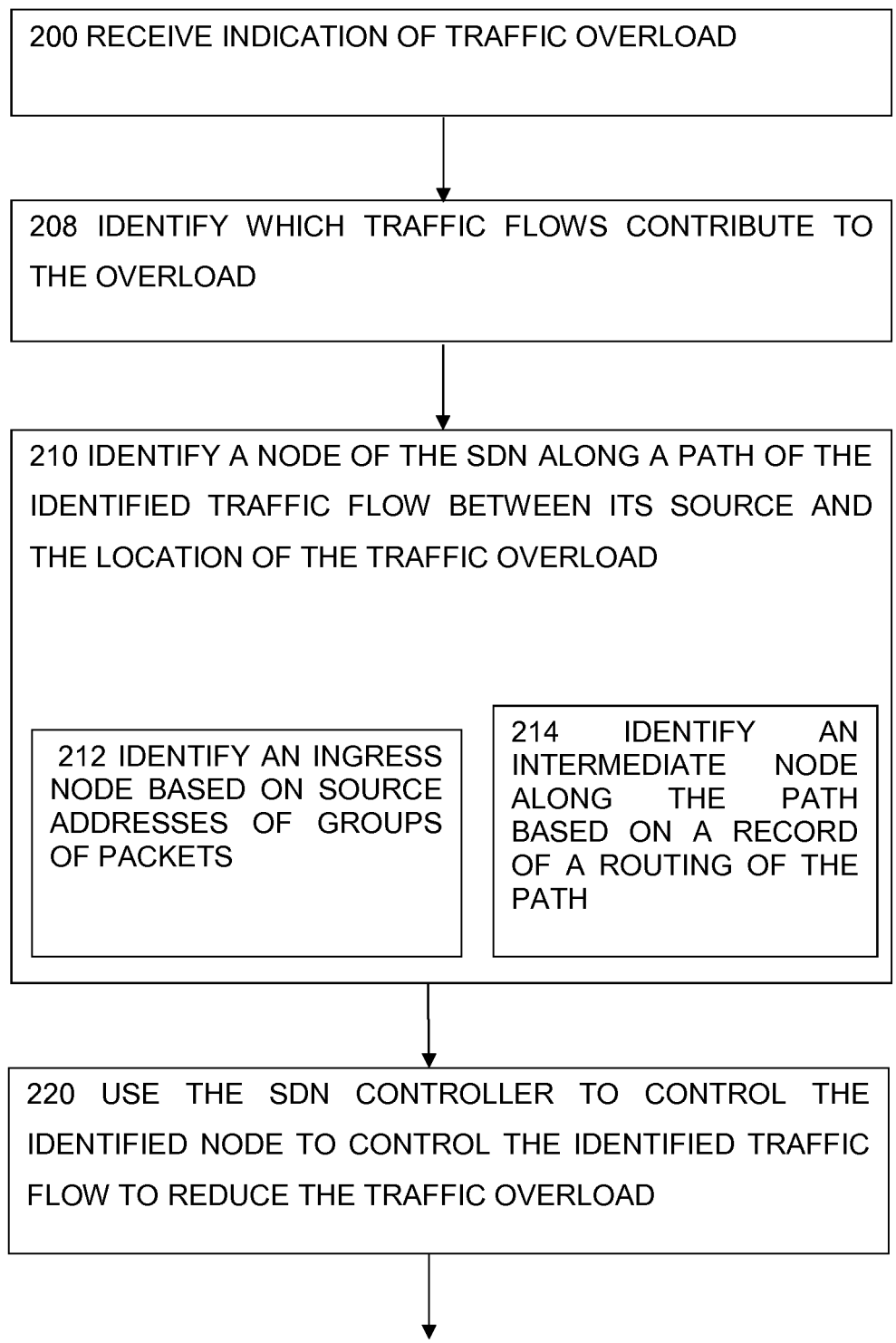
FIG. 5 shows steps of an embodiment showing ways of identifying which node to control.

FIG. 5, Embodiment Showing Ways of Identifying which Node to Control

FIG. 5 shows operational steps of the NMS_BP feature in or associated with the SDN controller according to an embodiment, and similar to those of FIG. 2 and corresponding reference numerals have been used as appropriate. At step 200 an indication of traffic overload is received. This indication then prompts a step 208 of identifying which traffic flows contribute to the overload. This enables step 210 of identifying a node along a path of the identified traffic flow, and step 220 of using the SDN controller to control the identified node to reduce the traffic overload as described above for FIG. 2. Within step 210 are shown two alternative ways of implementing this step of identifying a suitable node, labelled as step 212 and step 214. Step 212 involves identifying an ingress node of the traffic flow based on source addresses of groups of packets of the traffic flow. The ingress node is often the most suitable, as if a traffic flow is to be reduced or stopped, it is better to do so as close to the source as possible to avoid wasting resources used for carrying the traffic to another node where it is to be stopped or reduced. An alternative as shown in step 214 is to identify an intermediate node along the path based on a record of a routing of the path. This may be more appropriate if the flow is to be controlled by diverting it rather than stopping it. These are convenient ways of determining where to control the traffic flow to manage the traffic overload.

Figure 6:
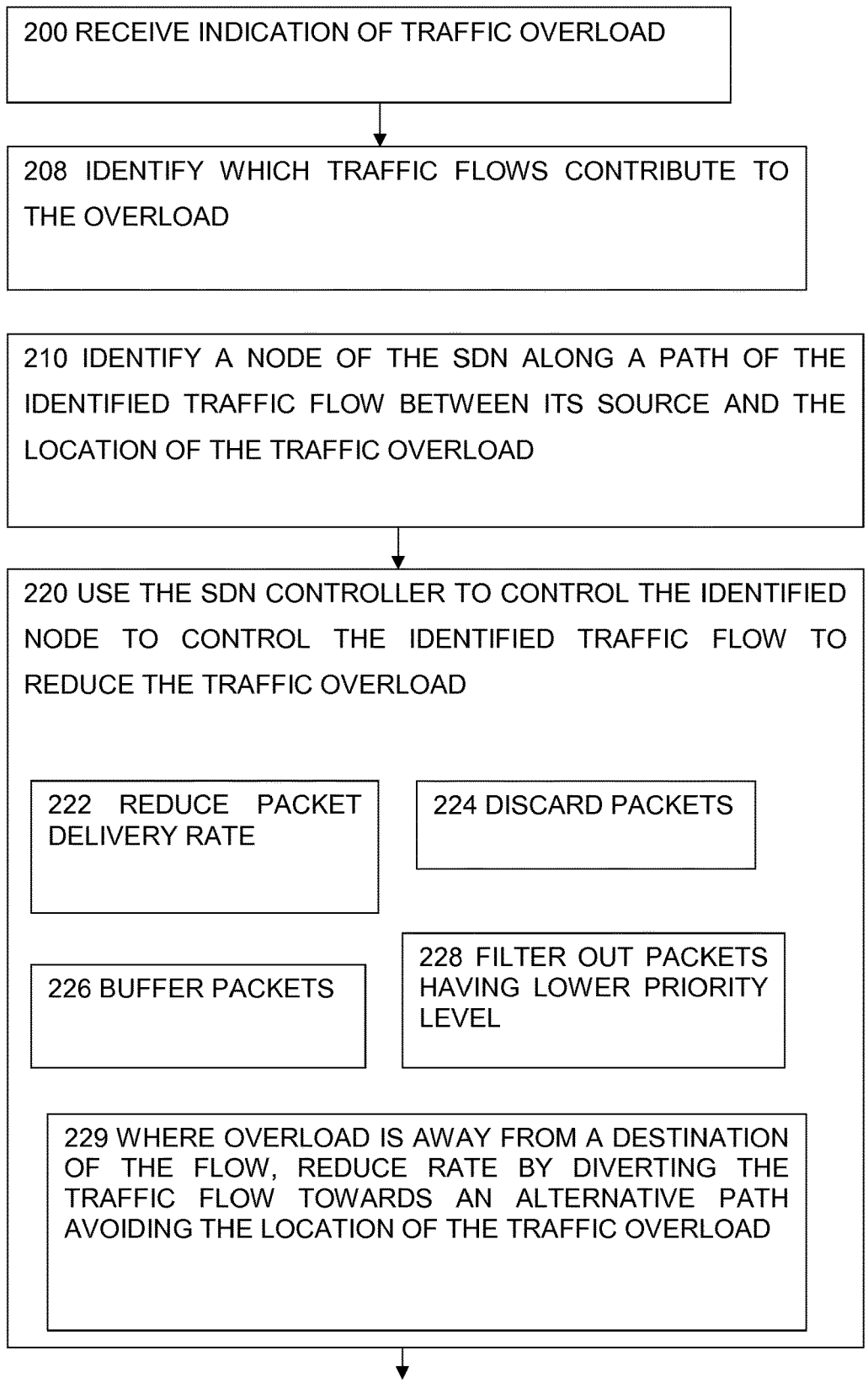
FIG. 6 shows steps of an embodiment showing ways of controlling the identified node.

FIG. 6, Embodiment Showing Ways of Controlling the Identified Node

FIG. 6 shows operational steps by an SDN controller according to an embodiment, and similar to those of FIG. 2 and corresponding reference numerals have been used as appropriate. As in FIG. 2 at step 200 an indication of traffic overload is received. This indication then prompts a step 208 of identifying which traffic flows contribute to the overload. This enables step 210 of identifying a node along a path of the identified traffic flow, and step 220 of controlling the identified node to reduce the traffic overload as described above for FIG. 2. Within step 220 are shown several alternative ways of implementing this step of controlling the identified at least one node to reduce the traffic overload. Step 222 shows the option of slowing down a packet delivery rate, step 224 shows a step of discarding packets, and step 226 shows an option of buffering packets. At step 228 there is a step of filtering out packets having a priority level lower than a given level. These are convenient ways to intervene so as to manage the overload efficiently. The priority level can be a general priority level, or a priority level specific to this control plane controlled rate reduction for example.

Step 229 shows diverting the identified traffic flow towards an alternative path avoiding the location of the traffic overload. This alternative can help to maintain the identified traffic flows while reducing the overload, if this is desired, for example where the traffic overload is away from a destination of the traffic flow. In some cases, the NMS_BP will send a request to control an identified traffic flow, in other words apply back pressure to slow down the rate of outgoing traffic or even to stop sending it for a while, as function of the level of resource congestion, or as function of congestion possibility. One of the aims of this approach is to anticipate the problem in order to be able to react in time so to prevent it from happening, i.e. to prevent or at least manage traffic disruption by controlling all the identified potential sources of heavy traffic.

In one example, the NMS_BP feature may identify as possible contributors to the traffic overload the traffic sourced from two servers, A and B, and decides that to solve the problem it is enough to ask them to temporary slowdown their traffic rate. Note that by so doing, the QoS and QoE are more likely to be guaranteed to all other users, while those users corresponding to the identified sources of excessive traffic are just slightly affected (some slowdown in the traffic rate), compared to. As part of the method, instead of generally requesting a whole traffic slowdown, the NMS_BP feature may ask the given servers to apply a certain policy, for instance a temporary policy of stopping sending data whose priority is less or equal to a given level (Back-Pressure priority).

Figure 7:
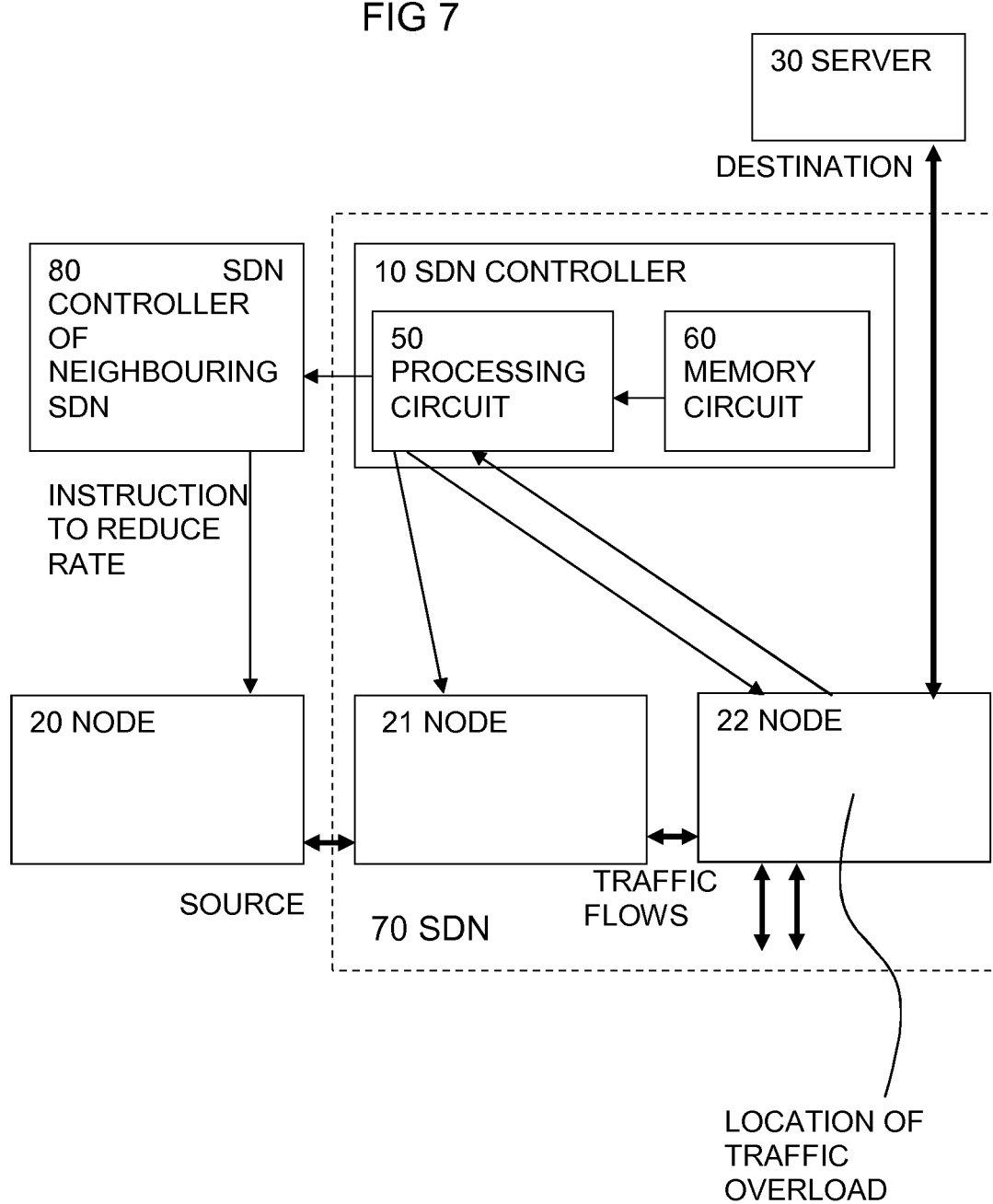
FIG. 7 shows a schematic view of an embodiment showing controlling by requesting a neighbouring SDN.

FIG. 7, Embodiment Showing Controlling by Requesting Neighbouring SDN

FIG. 7 shows a schematic view of an SDN network 70 similar to that of FIG. 1 and corresponding reference numerals have been used as appropriate. In this case nodes 21 and 22 belong to SDN 70 and node 20 belongs to a neighbouring SDN network and is controlled by an SDN controller 80 for that neighbouring SDN network. An interface is provided to enable the SDN controller 10 to send a request to the SDN controller 80 for that neighbouring SDN network, to cause it to control node 20. Hence in operation, where the source is identified as a link or interface to a neighbouring network, there is a step of controlling the identified node 20 by sending a request to that neighbouring software defined network to reduce a rate at which it sends the traffic flow to the interface. This can help enable the overload to be dealt with even closer to the source and can help avoid overloading the interface.

As an alternative, in case it is not possible to get control of the given sources of traffic e.g. because they are under the control of the neighbouring NMS, the SDN controller 10 may request its own nodes to filter out all the packets having the identified source addresses causing the overload and coming from that neighbouring network, brutally discarding packets instead of just slowing down or postponing delivery, but at least saving QoS and QoE of the other users. Cooperation between NMSs controlling different domains may be explored in order to reduce a likelihood of scenarios where packets are abruptly dropped.

Figure 8:
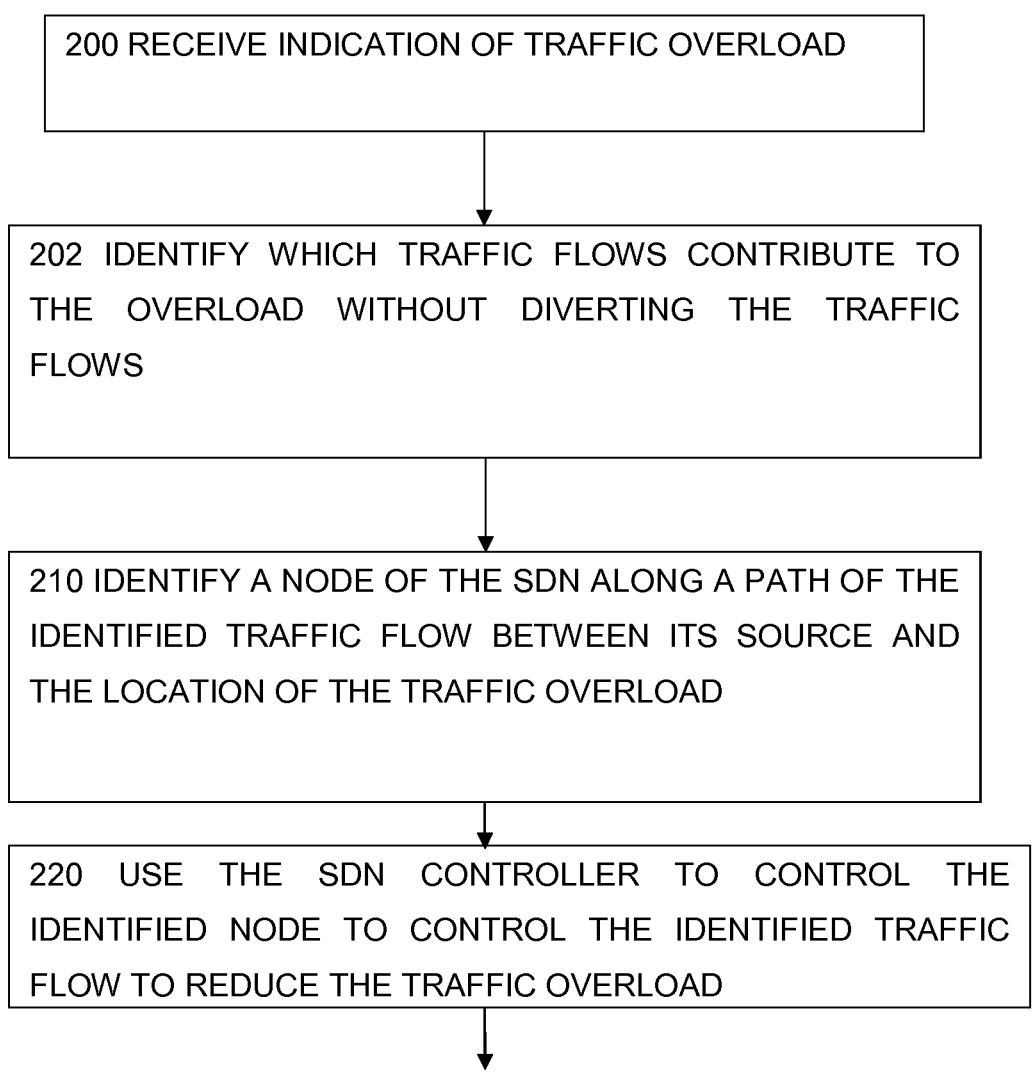
FIG. 8 shows steps of an embodiment with identification of traffic flows without diverting.

FIG. 8, Embodiment with Identification of Traffic Flows without Diverting

FIG. 8 shows operational steps of the NMS_BP feature in or associated with the SDN controller according to an embodiment, and similar to those of FIG. 2 and corresponding reference numerals have been used as appropriate. As in FIG. 2 at step 200 an indication of traffic overload is received. This indication then prompts a step 202 of identifying which traffic flows contribute to the overload, this step of identifying the traffic flows contributing to the overload being carried out without diverting the traffic flows. This can help reduce the need for resources required for such diverting. Other steps 210 and 220 can be carried out as described above for other embodiments.

Figure 9:
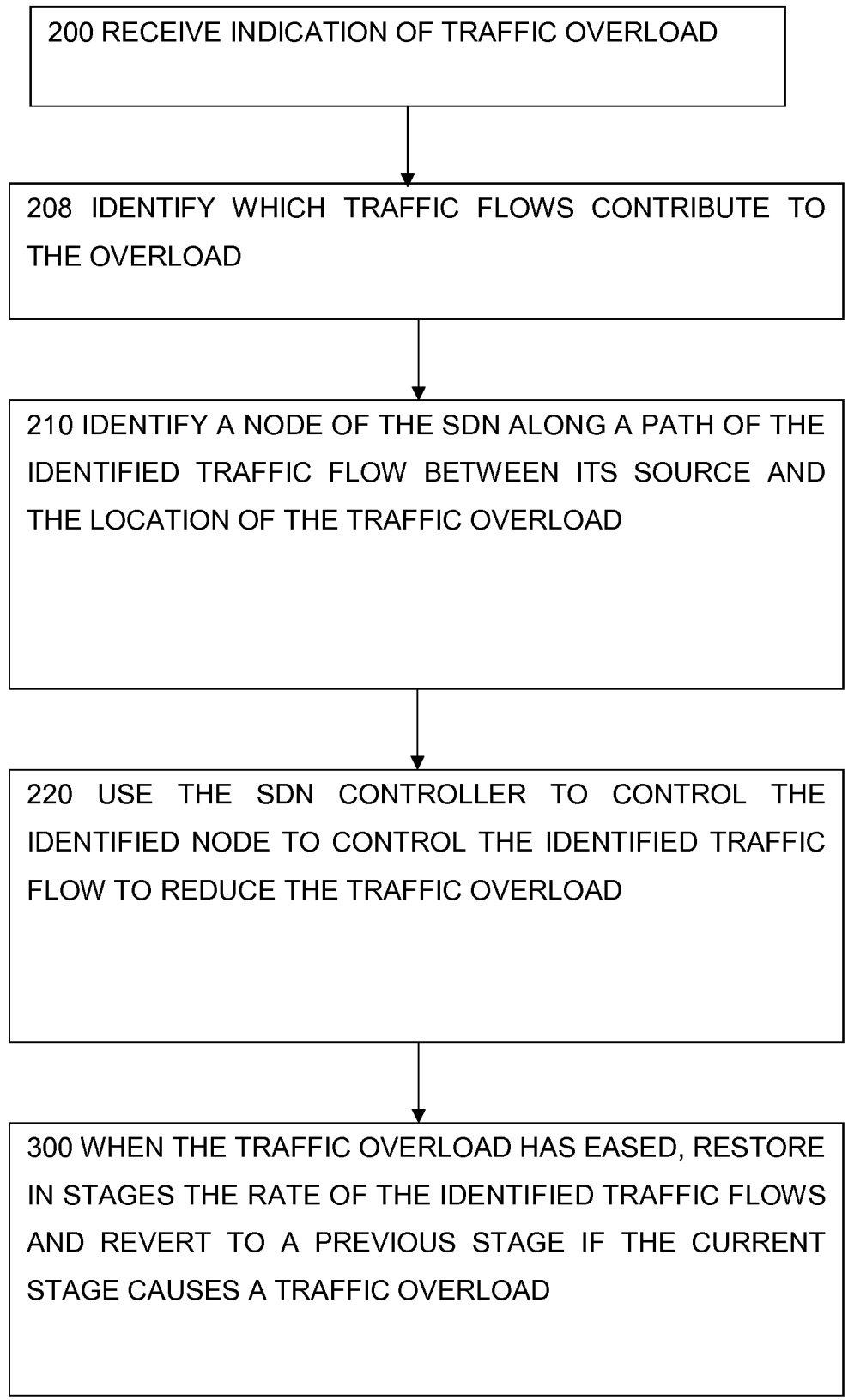
FIG. 9 shows steps of an embodiment with restoration of traffic flow in stages.

FIG. 9, Embodiment with Restoration of Traffic Flow in Stages

FIG. 9 shows operational steps of the NMS_BP feature in or associated with the SDN controller according to an embodiment, similar to those of FIG. 2 and corresponding reference numerals have been used as appropriate. As in FIG. 2 at step 200 an indication of traffic overload is received. This indication then prompts a step 208 of identifying which traffic flows contribute to the overload. Steps 210 and 220 can be carried out as described above for other embodiments. An additional step 300 is provided when the traffic overload has eased, of causing the identified at least one programmable node to restore in stages the rate of the identified at least one traffic flow. At each stage there can be a step of reverting to a previous stage of the restoration if a current stage of the restoration causes a traffic overload. This can help to avoid instability in managing the overload.

Figure 10:
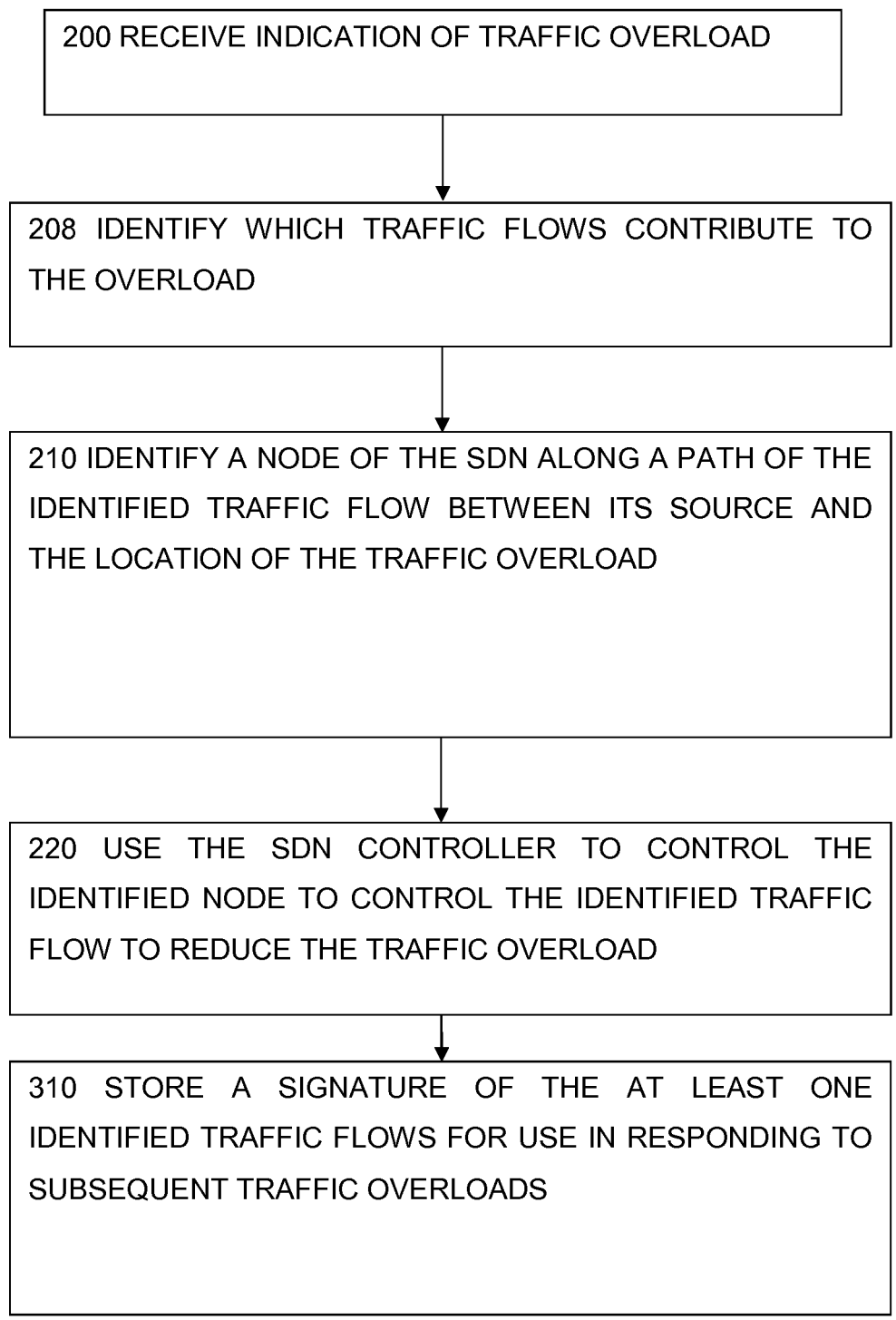
FIG. 10 shows steps of an embodiment with storing of a signature of identified traffic flows.

FIG. 10, Embodiment with Storing of Signature of Identified Traffic Flows

FIG. 10 shows operational steps of the NMS_BP feature in or associated with the SDN controller according to an embodiment, similar to those of FIG. 2 and corresponding reference numerals have been used as appropriate. As in FIG. 2 at step 200 an indication of traffic overload is received. This indication then prompts a step 208 of identifying which traffic flows contribute to the overload. Steps 210 and 220 can be carried out as described above for other embodiments. An additional step 310 is provided of storing a signature of the at least one identified traffic flows for use by the control plane in responding to subsequent traffic overloads. This can help to make the response quicker and more efficient if the same situation arises again.

Figure 11:
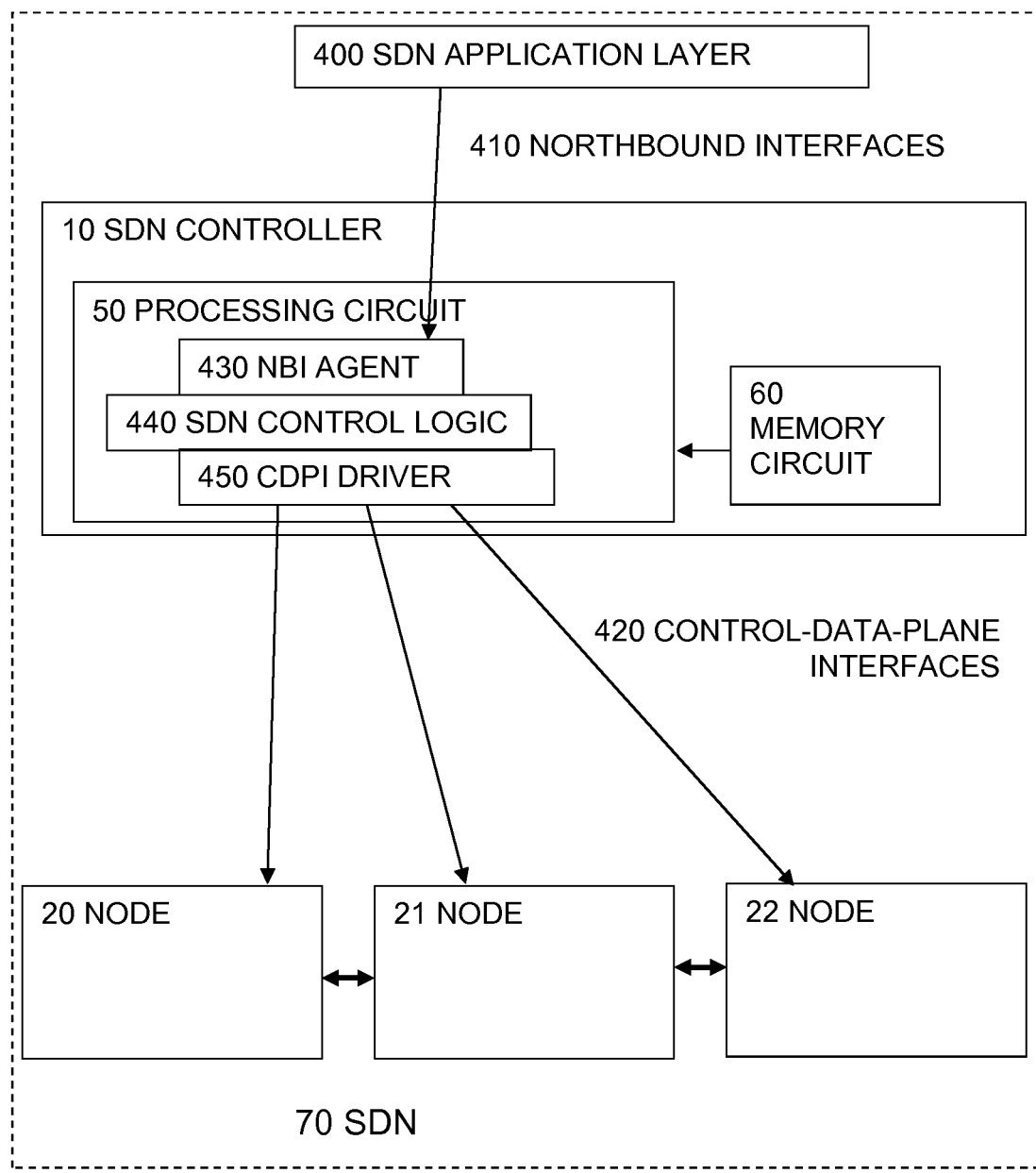
FIG. 11 shows a schematic view of an embodiment showing components of an SDN controller.

FIG. 11, Embodiment Showing Components of SDN Controller

FIG. 11 shows a schematic view of an SDN network 70 similar to that of FIG. 1 and corresponding reference numerals have been used as appropriate. In this case a number of functions or modules of the SDN controller 10 are shown within the processing circuit 50. A function or module for carrying out SDN control logic 440 is provided, which may be used to carry out some or all of the NMS_BP steps as described above in any of the embodiments. There is a northbound interface NBI agent 430 for handling northbound interfaces between the SDN control logic and an SDN application layer 400. A Control plane-Data Plane Interface CDPI driver is also provided between the SDN control logic and the nodes.

This SDN application layer can have programs that explicitly, directly, and programmatically communicate their network requirements and desired network behavior to the SDN Controller via NBIs. In addition they may consume an abstracted view of the network for their internal decision making purposes. An SDN Application typically consists of one SDN Application Logic and one or more NBI agents to drive the NBIs. SDN Applications may themselves expose another layer of abstracted network control, thus offering one or more higher-level NBI(s) through respective NBI agent(s) (not shown).

The SDN Controller can be a logically centralized entity in charge of (i) translating the requirements from the SDN Application layer down to the nodes which carry traffic flows over SDN Datapaths and (ii) providing the SDN Applications with an abstract view of the network (which may include statistics and events). An SDN Controller has one or more NBI Agents, the SDN Control Logic, and the CDPI driver. Definition as a logically centralized entity neither prescribes nor precludes implementation details such as the federation of multiple controllers, the hierarchical connection of controllers, communication interfaces between controllers, nor virtualization or slicing of network resources. The CDPI driver defined between an SDN Controller and the nodes and links of an SDN Datapath, can provide for example (i) programmatic control of all forwarding operations, (ii) capabilities advertisement, (iii) statistics reporting, and (iv) event notification. One value of SDN lies in the expectation that the CDPI is implemented in an open, vendor-neutral and interoperable way.

Figure 12:
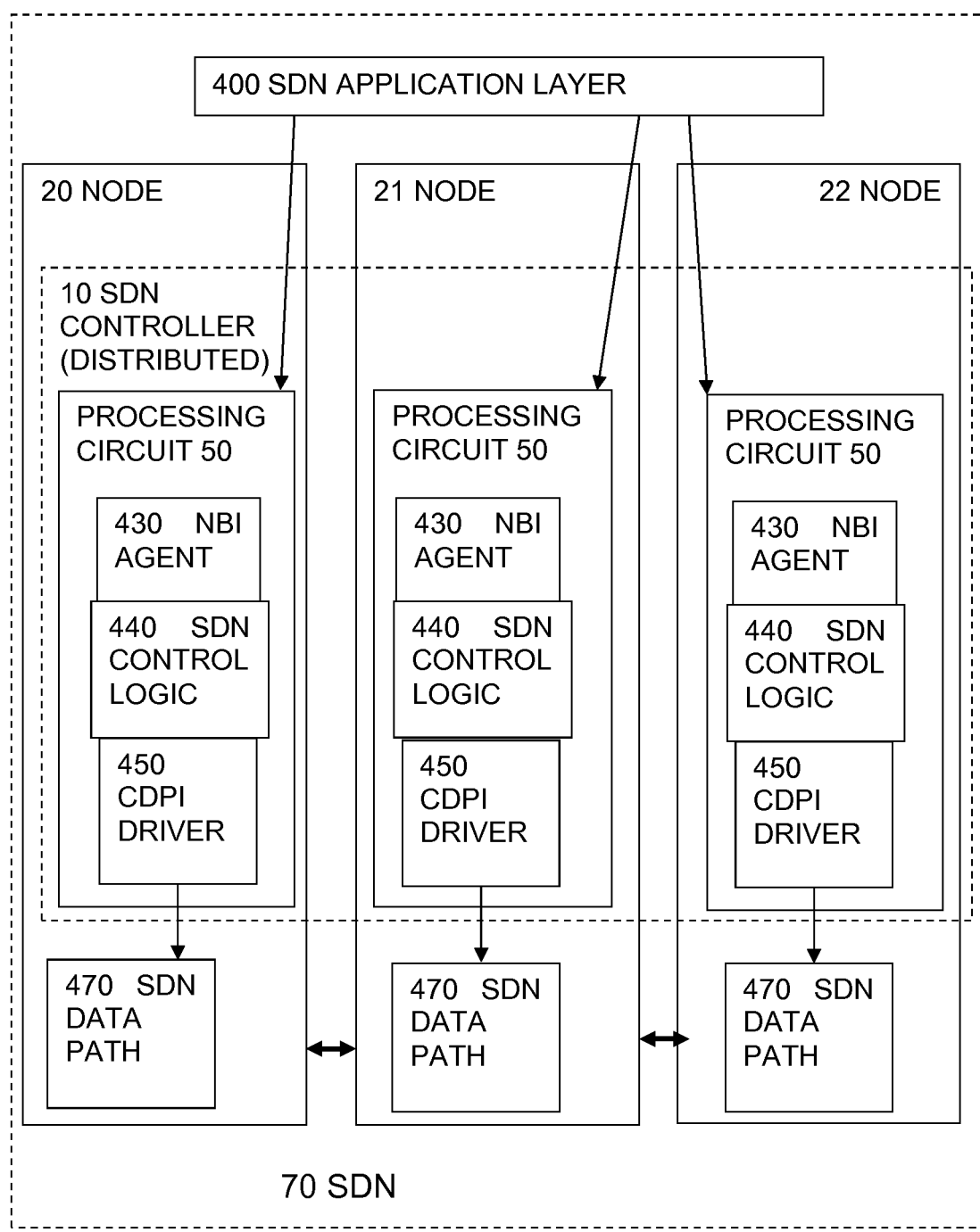
FIG. 12 shows a schematic view of an embodiment showing a distributed type of SDN controller.

FIG. 12, Embodiment Showing Distributed Type of SDN Controller

FIG. 12 shows a schematic view of an SDN network 70 similar to that of FIG. 1 and corresponding reference numerals have been used as appropriate. In this case the SDN controller is distributed across the various nodes 20, 21, 22. Each of the nodes has an SDN datapath circuit 470, and a processing circuit 50 with NBI agent 430, SDN control logic 440 and CDPI driver 450, and these parts can communicate with each other to share the processing load so that the functions of the SDN controller are still logically centralised, even if physically distributed. Within each node the CDPI driver 450 communicates with the SDN datapath circuit to provide the control of the traffic flow at the node as described above in relation to other embodiments. The SDN application layer 400 is not shown as being distributed but optionally may be distributed also.

Figure 13:
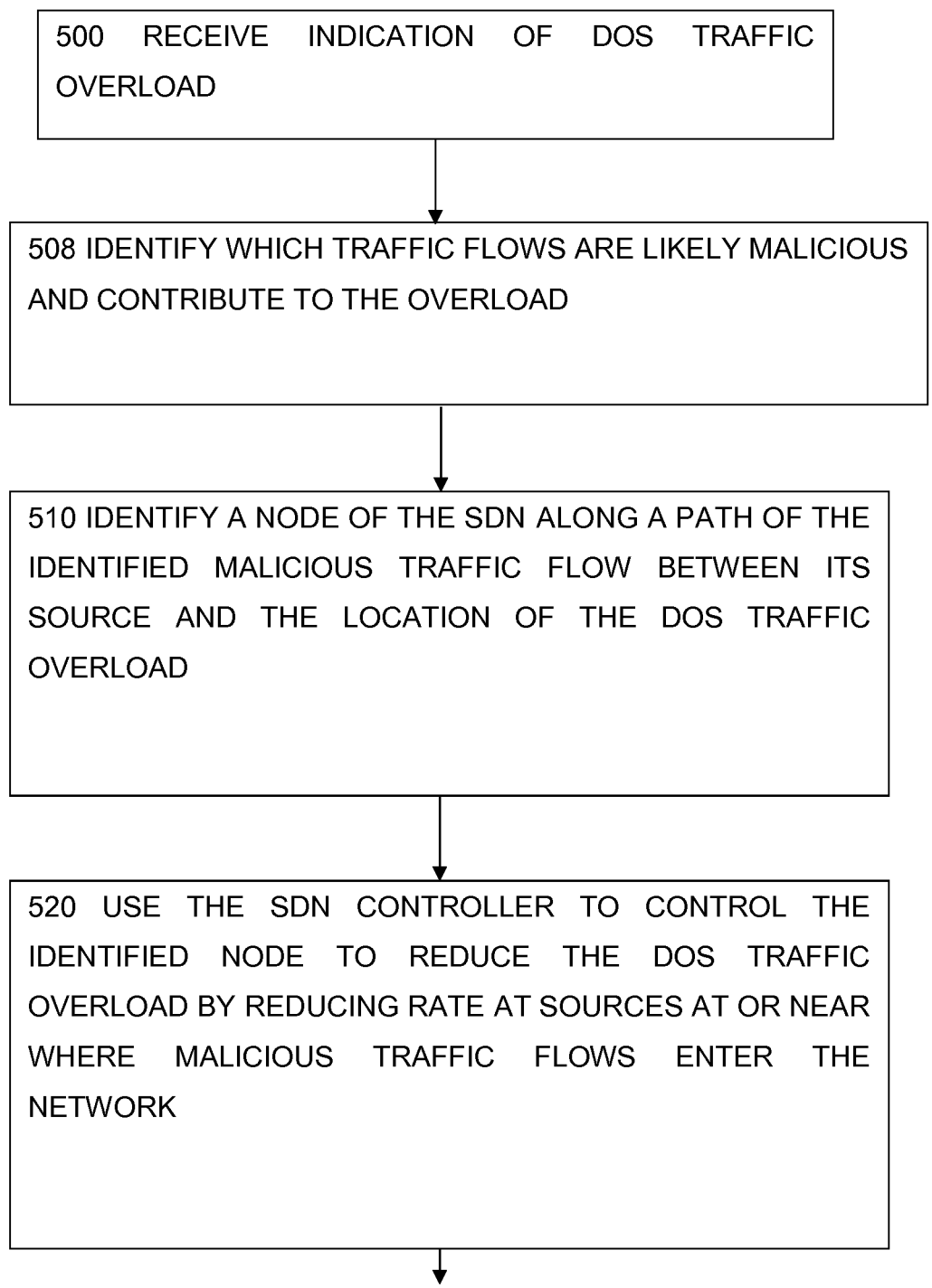
FIG. 13 shows steps of an embodiment showing application to manage a DoS type overload.

FIG. 13, Embodiment Showing Application to Manage DoS Type Overload

FIG. 13 shows operational steps of the NMS_BP feature in or associated with the SDN controller according to an embodiment similar to those of FIG. 2, but specific to managing a DoS traffic overload. As soon as an attack is in progress, i.e. bad sources send malicious traffic to a destination server of the given victim, if presumed malware sources are recognized as such, the NMS_BP feature can try to force down the sources of the attack. At step 500 an indication of DoS traffic overload is received. This can use the same techniques for detecting other types of traffic overload for example, or can be specific to DoS types of attack. This indication then prompts a step 508 of identifying which traffic flows are likely malicious and contributing to the overload. This can encompass any way of identifying such malicious traffic flows. This leads to step 510 of identifying a node of the SDN along a path of the identified malicious traffic flow between its source and a location of the DoS traffic overload. Then at step 520 there is a step of controlling the identified node to reduce the DoS traffic overload.

One type of DoS attack is the distributed denial-of-service (DDoS) attack where multiple systems are flooding of traffic the resources of a targeted victim system, usually a server. DDoS attacks involve multiple machines that generate much more traffic and are harder to counteract than a single attacking machine. If a given Server A is under such a flooding attack, it communicates to the NMS this critical situation. The NMS_BP feature can perform a statistical analysis of the incoming packets according to information provided by the attacked server A, trying to identify the particular set of packets that are causing overload, i.e. the collection of packets from one or more flows that have some property in common: for instance packets having same source address, same destination address, or potentially corrupted e.g. with bad checksum, etc.

The analysis can be based on a list of suspicious addresses, identified by means of some form of intelligence e.g.: known hackers, addresses corresponding to known areas of terrorism, etc., or by means of past history, for instance stored signatures available from some previous attack or by any other form of intelligence. Since the source addresses may be spoofed, making difficult to identify a particular signature, analysis may be based also on the traffic rate of certain addresses detected to be unusually and unreasonably high, such as a group of "zombie" machines continuously sending access requests to a given destination.

Addresses identified as potential source of the attack are filtered out as illegitimate. Filtering may be applied at the ingress edge adjacent to the attacker, if possible, and/or placed at some strategic port along the path. Further refinement of analysis can be done iteratively by looking to results of various filtering actions e.g. by temporally re-admitting a given address. In some cases, the NMS_BP may apply a policy to filter out all low priority addresses while letting pass high priority (secured) addresses only, so guaranteeing the service at least to some e.g. institutional, business, etc. users. A list of high priority addresses of users to be secured in case of attack, can be made available by relevant authorities. If the traffic overload problem persists, the NMS_BP may selectively filter out all addresses at different times in sequence, to find out which are cloned, e.g. one by one, to further refine the diagnosis.

Once the attacked server has no more need of help, the NMS_BP may restore the traffic flows by releasing the filter out command to all the addresses, or to a sub-set of them as function of the presumed dangerousness. The method can be useful to counteract many types of attack where malicious traffic should be filtered out, e.g. "ping flood" or "smurf attack" where the attacker overwhelms the victim with ICMP Echo Request packets: NMS_BP can control nodes to filter out such packets on the given paths. Based on historical diagnosis using stored signatures of previous events and results, intermittent attacks too can be effectively counteracted.

Concluding Remarks

As described above the embodiments can provide simple, easy and appropriate methods for efficient overload prevention and management at the source of the issue, and an effective counteraction against cyber-attacks. The amount of traffic within a wide area of the network, issued by devices at the network edge, can be controlled, temporarily reduced or even filtered out, by means of the described NMS_BP feature using the SDN controller. Filters can be dynamically placed, and so optimize the counteraction. In some cases, comparisons with stored signatures can enable malicious sources to be identified, and congestion and/or attack prevention can be directed as near as possible to the source.

The embodiments may prevent the critical (e.g. malicious attack) traffic from reaching the overload location or victim without affecting the benign traffic; that is the method may be able to differentiate for instance a malicious traffic flow from a regular benign flow. The method is scalable and not limited in the number of overloads or attacks that can be addressed. It can respond quickly and flexibly, without any manual intervention from the operator, to any change in congestion and/or attack distribution.

It may be invoked only when a possible congestion is detected, e.g. during the attack time, and otherwise it allows the network to work normally. The provided mechanism can be arranged to retain the overload and/or the attack evidence (history) for any future intervention or for legal proceedings. The feature is suitable for incremental deployment, and need not be resource intensive. Other variations or additions can be envisaged within the boundaries of what is claimed.

The invention claimed is:

1. A method of managing a traffic overload in a software defined network having an SDN controller and the method having steps of:
    receiving an indication of a traffic overload;
    identifying at least one traffic flow which contributes to the traffic overload;
    identifying at least one node of the software defined network which is configured to be controllable by the SDN controller and located along a path of at least one of the identified traffic flows between its source and a location of the traffic overload; and
    responding to the traffic overload by using the SDN controller to control the identified at least one node to control the identified at least one traffic flow to reduce the traffic overload,
    wherein controlling the identified at least one node to reduce the traffic overload comprises, if the source is an interface with a neighbouring software defined network that is controlled independently of the SDN controller, sending a request to that neighbouring software defined network to reduce a rate at which the neighboring software defined network sends the traffic flow to the interface.

2. The method of claim 1, the step of identifying the at least one traffic flow which contributes to the overload by analysing packet information of the traffic which could reach the location of the traffic overload.

3. The method of claim 2, the analysing comprising at least one of: finding groups of packets having characteristics in common, comparing address information in the packet information to a predetermined selection of addresses, comparing source address information to a predetermined selection of source addresses, identifying groups having the same destination address, identifying corrupted packets, identifying anomalous rates of occurrence of given addresses, and identifying changes when a rate of one traffic flow is temporarily altered.

4. The method of claim 2, the step of identifying at least one node of the software defined network comprising at least one of: identifying an ingress node based on source addresses of the groups of packets, and identifying an intermediate node along the path based on a record of a routing of the path.

5. The method of claim 1, the step of controlling the identified at least one node to reduce the traffic overload comprising at least one of: slowing down a packet delivery rate, discarding packets, buffering packets, and filtering out packets having a priority level lower than a given level.

6. The method of claim 1, the step of controlling the identified at least one node to reduce the traffic overload comprising diverting the identified traffic flow towards an alternative path avoiding the location of the traffic overload.

7. The method of claim 1, the step of identifying the traffic flows contributing to the overload being carried out without diverting the traffic flows.

8. The method of claim 1, having the subsequent step of causing the identified at least one programmable node to restore in stages the rate of the identified at least one traffic flow when the traffic overload is eased, and reverting to a previous stage of the restoration if a current stage of the restoration causes a traffic overload.

9. The method of claim 1, having the step of storing a signature of the at least one identified traffic flows for use by the control plane in responding to subsequent traffic overloads.

10. A non-transitory machine-readable medium having instructions stored thereon which when executed by a processor cause the processor to carry out a method of managing a traffic overload in a software defined network having an SDN controller, wherein the method comprises:

receiving an indication of a traffic overload;

identifying at least one traffic flow which contributes to the traffic overload;

identifying at least one node of the software defined network which is configured to be controllable by the SDN controller and located along a path of at least one of the identified traffic flows between its source and a location of the traffic overload; and responding to the traffic overload by using the SDN controller to control the identified at least one node to control the identified at least one traffic flow to reduce the traffic overload, wherein controlling the identified at least one node to reduce the traffic overload comprises, if the source is an interface with a neighbouring software defined network that is controlled independently of the SDN controller, sending a request to that neighbouring software defined network to reduce a rate at which the neighboring software defined network sends the traffic flow to the interface.

11. An apparatus for managing a traffic overload in a software defined network, the network having an SDN controller and nodes capable of passing traffic flows and being controllable by the SDN controller, the apparatus having a processing circuit and a memory circuit, the memory circuit having instructions executable by the processor circuit, wherein said processing circuit when executing the instructions is configured to:

receive an indication of a traffic overload;

identify at least one traffic flow which contributes to the traffic overload;

identify at least one node of the software defined network along a path of at least one of the identified traffic flows between its source and a location of the traffic overload; and respond to the traffic overload by using the SDN controller to control the identified at least one node to control the identified at least one traffic flow to reduce the traffic overload, wherein for the operation of controlling the identified at least one node, the processing circuit is configured to send, if the source is an interface with a neighbouring software defined network that is controlled independently of the SDN controller, a request to that neighbouring software defined network to reduce a rate at which the neighboring software defined network sends the traffic flow to the interface.

12. The apparatus of claim 11, the processing circuit being configured to identify the at least one traffic flow which contributes to the overload by analysing packet information of the traffic which could reach the location of the traffic overload.

13. The apparatus of claim 12, wherein for the operation of the analysing, the processing circuit is adapted to perform at least one of: finding groups of packets having characteristics in common, comparing packet address information of the packet information to a predetermined selection of addresses, comparing source address information to a predetermined selection of source addresses, identifying groups having the same destination address, identifying corrupted packets, identifying anomalous rates of occurrence of given addresses, and identifying changes when a rate of one traffic flow is temporarily altered.

14. The apparatus of claim 12, wherein for the operation of identifying at least one node of the software defined network, the processing circuit is adapted to perform at least one of: identifying an ingress node based on source addresses of the groups of packets, and identifying an intermediate node along the path based on a record of a routing of the path.

15. The apparatus of claim 11, wherein for the operation of controlling the at least one of the nodes, the processing circuit is adapted to perform at least one of: slowing down a packet delivery rate, discarding packets, buffering packets, and filtering out packets having a priority level lower than a given level.

16. The apparatus of claim 11, wherein for the operation of controlling the at least one of the nodes, the processing circuit is adapted to divert the identified traffic flow towards an alternative path avoiding the location of the traffic overload.

17. The apparatus of claim 11, the apparatus comprising the SDN controller.

18. The method of claim 1, wherein sending the request to the neighboring software defined network that is controlled independently of the SDN controller comprises sending the request to a controller of the neighboring software defined network.

19. The method of claim 10, wherein sending the request to the neighboring software defined network that is controlled independently of the SDN controller comprises sending the request to a controller of the neighboring software defined network.

20. The method of claim 11, wherein the processing circuit being configured to send the request to the neighboring software defined network that is controlled independently of the SDN controller comprises the processing circuit being configured to send the request to a controller of the neighboring software defined network.

* * * * *